(12) United States Patent
Koh et al.

(10) Patent No.: US 7,660,871 B2
(45) Date of Patent: Feb. 9, 2010

(54) SYSTEM AND METHOD FOR AUTOMATICALLY GENERATING NETWORKED SERVICE INSTALLATION BASED ON SUBSCRIPTION STATUS

(75) Inventors: Jerry K. Koh, Redmond, WA (US); Emmanuel Miranda-Steiner, Kirkland, WA (US); Eric Hebenstreit, Bellevue, WA (US); Elizabeth J. Gentile, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 978 days.

(21) Appl. No.: 10/855,631

(22) Filed: May 28, 2004

(65) Prior Publication Data

US 2005/0278748 A1 Dec. 15, 2005

(51) Int. Cl.
*G06F 15/16* (2006.01)
(52) U.S. Cl. .................. 709/217; 709/203; 709/222; 709/250
(58) Field of Classification Search ......... 709/202–203, 709/217–219, 222, 250
See application file for complete search history.

(56) References Cited

U.S. PATENT DOCUMENTS

| | | | | |
|---|---|---|---|---|
| 5,650,994 A | * | 7/1997 | Daley | 709/220 |
| 5,920,846 A | * | 7/1999 | Storch et al. | 705/7 |
| 6,110,228 A | * | 8/2000 | Albright et al. | 709/217 |
| 6,178,438 B1 | * | 1/2001 | Tschirhart et al. | 709/218 |
| 6,557,054 B2 | * | 4/2003 | Reisman | 709/219 |
| 6,976,066 B1 | * | 12/2005 | Mouhanna et al. | 709/217 |
| 7,240,107 B2 | * | 7/2007 | Chase-Salerno et al. | 709/222 |
| 2006/0041660 A1 | * | 2/2006 | Bishop et al. | 709/224 |

* cited by examiner

*Primary Examiner*—Bharat N Barot
(74) *Attorney, Agent, or Firm*—Shook, Hardy & Bacon L.L.P.

(57) ABSTRACT

A system and related techniques prepare and condition the installation of new networked service or application components, such as Internet services, based on an individual subscriber's subscribed-to services, features and other components. A subscriber to an Internet service may choose to add, for example, a componentized subscription to a music or video download service to their access plan. When the user inserts a CDROM or accesses a Web site for installation, the user may be prompted for a username or passport-type object to authenticate their account. The user may then be presented with a set of available service selections, extensions or enhancements to choose to add to their plan. Those available selections may be prefiltered or prequalified, for example, based on geographic location, account spending or access limits, language or other criteria. Because the installation engine delivers components which are intelligently filtered at time of installation, the service components or applications can be tailored to that specific user's needs and options, instead of downloading or installing a monolithic package which may contain services not available or of interest to that user.

33 Claims, 4 Drawing Sheets

SYSTEM AND METHOD FOR AUTOMATICALLY GENERATING NETWORKED SERVICE INSTALLATION BASED ON SUBSCRIPTION STATUS

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of networked computer services, and more particularly to a platform which automatically detects and presents networked service options and components, for instance Internet access and media installation options, based on individual subscribers' subscribed services and related status.

BACKGROUND OF THE INVENTION

Internet services are commonly advertised and provisioned using distributed CD-ROM bundles or Web site downloads. To ensure uniformity and economize bulk delivery costs, those media or downloads, however, are typically not tailored to the needs or access privileges of individual users. Rather, the Web browser, media player or other applications, services or components may instead be installed in a single, uninterruptible, fixed installation script which installs a monolithic package of components to the user's computer or other client.

When a user installs a client, service, media engine or other component from such prepackaged media or downloads, therefore, the classes, types and defaults in the service components delivered to that user may be undesired and extraneous to that person's usage needs. For example, language options may be installed which are not generally used in the user's geographic location, or media options which are not compatible with the user's access mode, such as dial-up, may be installed. This lack of selectability in the installation process may load the user's storage with unnecessary, and occasionally incompatible, features. Likewise a user who attempts to remove unnecessary components may cause unintended bugs or interruptions to the services they do actually want.

Moreover, when network services are installed using conventional techniques, the individual user's existing or desired access rights may be totally ignored. Many users may for instance choose to update or upgrade a browser, media client or associated Web services such as email, Web hosting, music downloads or others on an existing Internet service or other account. One-size-fits all installations routines as currently practiced do not in any way reference a user's existing subscription profile to pare down and isolate only those service components for that user's current service list. Nor do known installers attempt to differentiate desired from undesired services and thereby install only necessary supporting components when a new user initiates entirely new service. Other problems and inefficiencies in the provisioning and installation of network services exist.

SUMMARY OF THE INVENTION

The invention overcoming these and other problems in the art relates in one regard to a system and method for automatically generating a network service installation based on a user's subscription status, in which an installation engine may initiate service provisioning and installation from CD-ROM, Internet downloads or other channels or media. In embodiments, the installation engine will access the user's subscription status from a subscription database or other data store to separate the subset of components, services, applications or other features or functions from all possible installation components which the user desires or is entitled to install. Those components may include, for example, email or Web hosting service, anti-spam or anti-virus services or utilities, media services or portals, or other channels, services or components, all tailored and installed according to the user's new or existing subscription profile. Because unnecessary components, code, data and other resources are filtered out before installation to the user's client or other machine, a more streamlined, more bug-free and user-friendly service initiation process may be enjoyed.

DETAILED DESCRIPTION OF EMBODIMENTS

Figure 1:
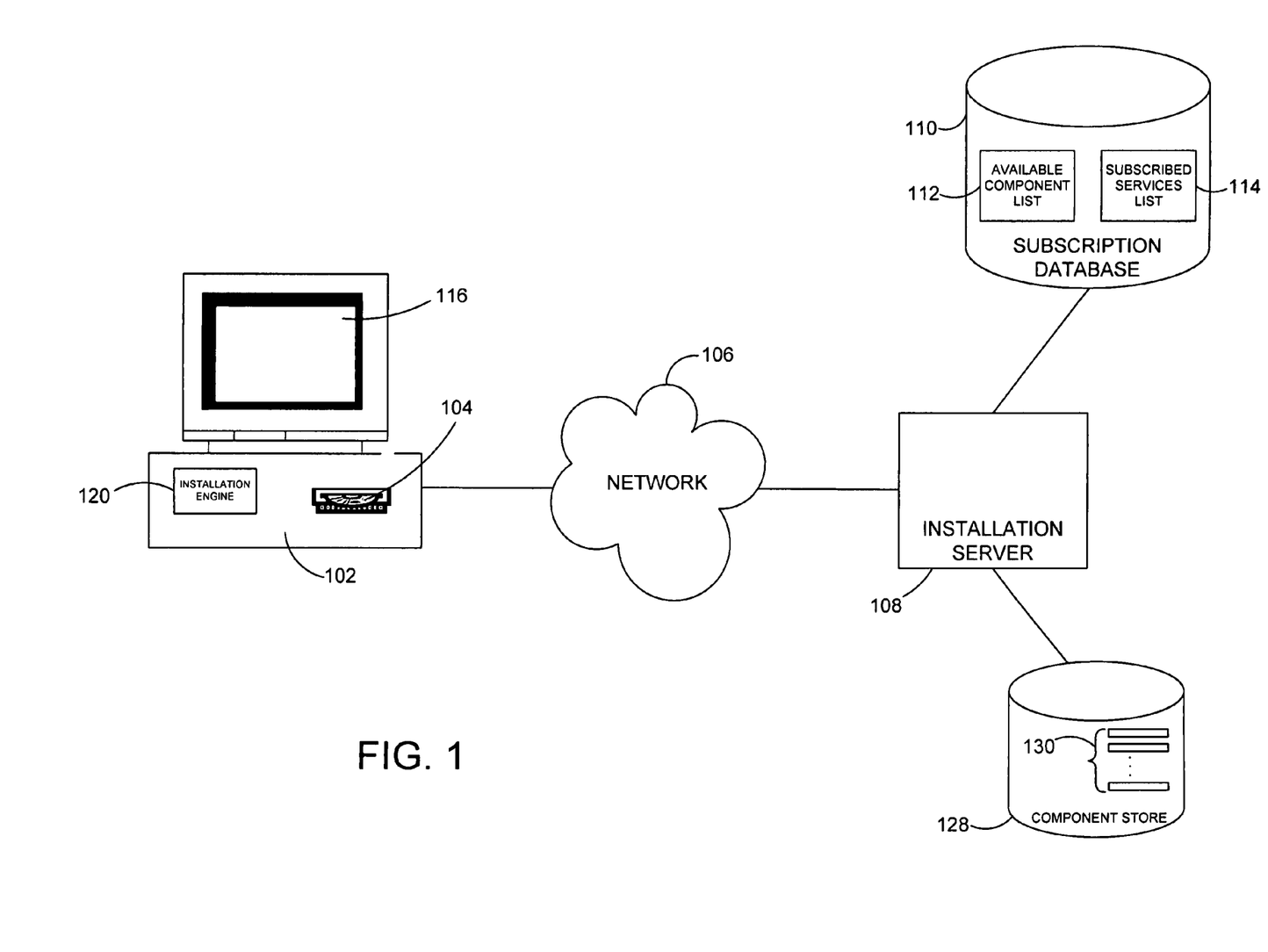
FIG. 1 illustrates a network environment in which a system and method for automatically generating a service installation may operate, according to embodiments of the invention.

FIG. 1 illustrates an architecture in which a system and method for installing computer network service components on a client may operate, according to an embodiment of the invention. Various aspects of embodiments of the invention may be described in the general context of computer code or machine-useable instructions, including computer-executable instructions such as program modules, being embodied on computer-storage media and being executed by a computer or other machine. Computer-storage media include both volatile and nonvolatile media, removable and nonremovable media, and contemplate media readable by a processor. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. As illustrated in that figure FIG. 1, a user may operate a client 102 using a user interface 116 such as a graphical user interface (GUI) or other to initiate and guide an installation process of one or more components for services of their choosing. As illustrated, the user may initiate the service installation process by inserting media 104 such as a CD-ROM into the client 102, or, in embodiments may access a network 106 such as the Internet or other network 106 or a combination of the two, in embodiments, the client may host and execute an installation engine 120 to manage the distribution of new service components to the client 102 and/or the user's subscription account.

The service components which the user may choose to install or initiate on client 102 or associated account may include a range of network access features, services and media. The service components may include, for example, one or more email accounts, or a Web site hosting service, for instance with a certain amount of storage (e.g. 10 MB or other) for new or existing accounts. The service components may likewise include utilities and tools, such as anti-spam filters for email or other communications channels, anti-virus tools for client 102 or other machines, or the provisioning of Internet access itself, via network 106 or otherwise. The service components managed according to embodiments of the invention may likewise encompass media and other services, such as digital photo or other file sharing, music download service, video download service or other media delivery services. The service components may likewise include Web or other services such as financial, medical, educational or other portals, or other personal or business resources. In embodiments, the selection and installation of eligible services may include the installation of corresponding application components, interfaces or resources, such as Web browsers, media players including audio or video codecs, email clients, or other components or services.

According to embodiments as shown in FIG. 1, when the user inserts media 104 or accesses a Web site via network 106, installation logic may be started which analyzes and delivers content and components to client 102 or otherwise which matches the user's subscription status. According to embodiments in one regard, the client 102 may communicate with installation server 108 to facilitate that provisioning. Installation server 108 may be or include a local or remote server which may in turn communicate with a subscription database 110, to identify appropriate service components for the requesting user. Toward that purpose, subscription database 110 may host resources including an available component list 112, a subscriber services list 114 and other data or connections.

When the installation engine 120 is notified that a new installation event has begun, the installation engine may prompt the user for user ID, login or other account or identification information. For instance, an existing user desiring to update or upgrade services may enter their existing user name or account name, while a new user may enter a new user or account name to be activated. Installation engine 120 may authenticate the user's entered account and other information as appropriate, for instance by performing a lookup of that information against subscription database 110. This authorization process may in one regard be performed before components, code or other data may be installed onto client 102 or activated in an associated account, thereby again avoiding unnecessary or inappropriate delivery of undesired components.

After the initiating user has been authenticated, the installation engine 120 may access the subscription database 110 to reference an available component list 112, to begin to isolate eligible components for that user. Available component list 112 may include or interface to, for example, a list or set of service components which are available to the user based on their geographic location, market or co-branding preferences, language requirements or other governing criteria or factors. For instance, the available component list 112 may indicate that for User X updating their service components in, for illustration South America, certain services such as Internet telephony may be available, or that eligible components must include services delivered in Spanish, Portuguese, English or other languages. In embodiments, marketing terms or conditions, such as the user's agreement to use their telephone company's affiliated cellular telephone or network-enabled data service, may narrow the set of services in and presented by the available component list 112. Likewise in cases a user's age or other criteria may affect or filter the services stored to or accessed from available component list 112.

The installation engine 120 may likewise access the subscribed services list 114 for the initiating user, which data may also be stored in subscription database 110. The subscribed services list 114 may contain a list, table or other data structure recording the services and components which a user may currently subscribe to, or which are awaiting activation or are currently in other status. Thus for a given user, the subscribed services list 114 may contain selections or components such as email, Web hosting, music downloads, Internet banking or email payment service, or other services or components.

Those services or components may in embodiments be or include some services or components whose subscription is free of charge, and others which involve a monthly or other subscription fee. For example some services, such as on-demand music download, may incur a per-track download charge. Some services in subscribed services list 114 may be dependent on subscription to other services, such as anti-spam tools which may depend on email service. Other subscription arrangements, charges and combinations are possible. The installation engine 120 may in embodiments compare the components in the available component list 112 for the initiating user against the subscribed services list 114, to generate a set of eligible components based on the matching components from that data.

According to embodiments illustrated in FIG. 1, the installation server 108 may likewise communicate with a component store 128 hosting a set of software or service components 130 available in available component list 112 or otherwise, to permit accessing or downloading of those components and resources by authorized clients. In embodiments the set of software or service components 130 may be stored in or distributed from other local or remote storage resources, depending on configuration.

Figure 2:
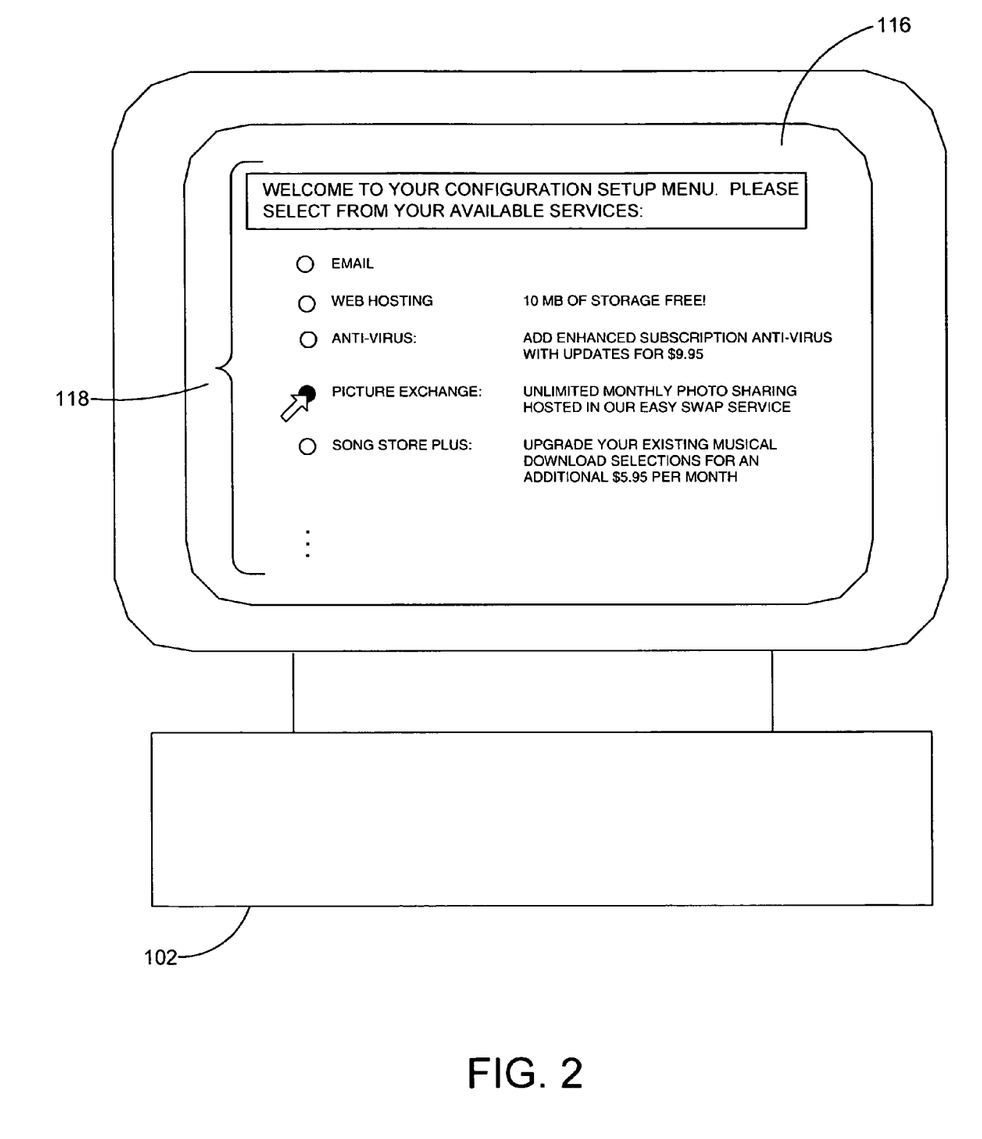
FIG. 2 illustrates a user interface with illustrative installation options, according to an embodiment of the invention.

Upon initiation of a service installation and the isolation of eligible components via the subscription database 110, as illustrated in FIG. 2 the user may be presented with a set of installation options 118 on user interface 116. Those installation options 118 may again and as illustrated include services or components such as email, Web hosting, anti-virus or other utilities, music, video or other download options, or other services or resources. After the user's selections from the set of installation options 118 are made, the installation engine 120 may initiate the building of those components on client 102 or otherwise. For example, a new or updated media player may be installed to client 102.

The components to be installed may in embodiments be retrieved or delivered from media 104, from the component store 128, from both media 104 and component store 128, or via other channels or resources. In embodiments, components transmitted from installation server 108 may be communicated through application or service-aware protocols, for example ActiveX™, Java™, XML (eXtensible Markup Language) or other code, data or resources. The installation engine 120 may communicate with installation server 108 to update the user's subscribed services list 114, to reflect those newly chosen or installed components or services for that user's account or profile. In embodiments, the user may likewise remove or unsubscribe from given components, when desired.

Figure 3:
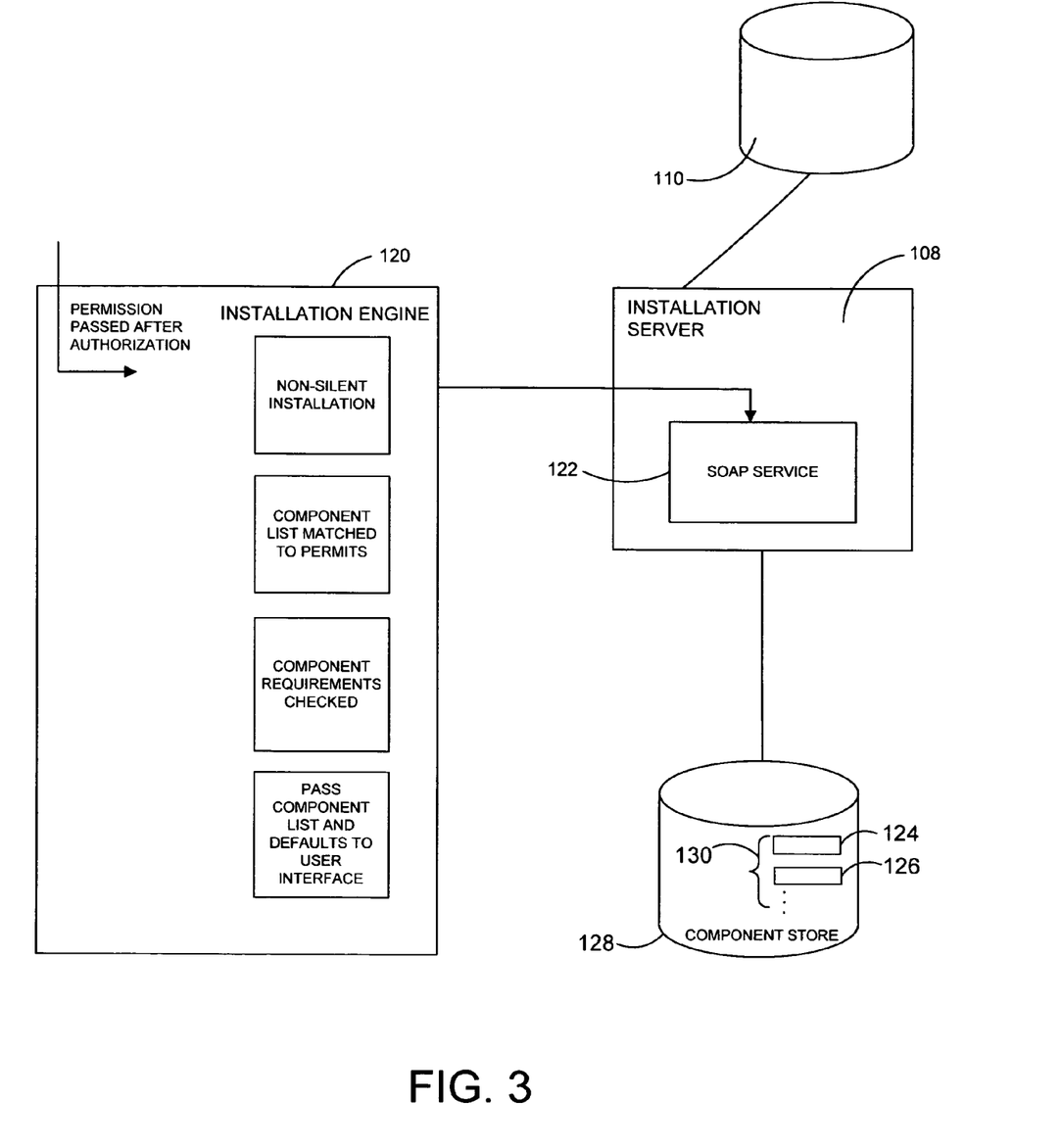
FIG. 3 illustrates a logical architecture for an installation engine, according to an embodiment of the invention.

FIG. 3 illustrates a logical architecture for the installation engine 120 and other resources, according to an embodiment of the invention. As shown the installation engine 120 may execute an installation script or processing which is in one regard dependent on user authorization and that user's subscription status. According to that processing in one regard, the installation engine 120 may commence a non-silent installation when a user inserts media 104, accesses network 106 or takes other steps to begin the addition or subtraction of components to or from a new or existing user subscription or account. The user's subscribed services list 114, or desired or selected components or services and associated component permits may be checked against available component list 112 to determine the intersection of those components. In embodiments, component requirements, such as geographic, language, or in some cases, machine-specific criteria for client 102 (such as minimum available storage) or other requirements may be checked. Again after the set of eligible components are generated, they may be passed to the user interface 116. In embodiments the installation engine 120 and user interface 116 may also receive or present a set of default selections, such as components commonly chosen or subscribed to in the user's location or at the user's given service level.

According to the logical architecture as shown, the set of eligible services and other data may be communicated to the installation server 108, which in embodiments and as illustrated in FIG. 3 may host a network access service such as a SOAP (simple object access protocol) service 122, to facilitate the transmission of component objects selected out by the initiating user. In arrangements as shown, the installation server 108 may access component store 128 or other resources to access or retrieve a set of market-specific components 124, associated XML code or data as well as one or more default component package 126 to transmit to client 102 via installation engine 120. Those default components may for instance be selected and accessed when the user interface 116 permits the user to choose an abbreviated installation process which accepts default services or components.

Figure 4:
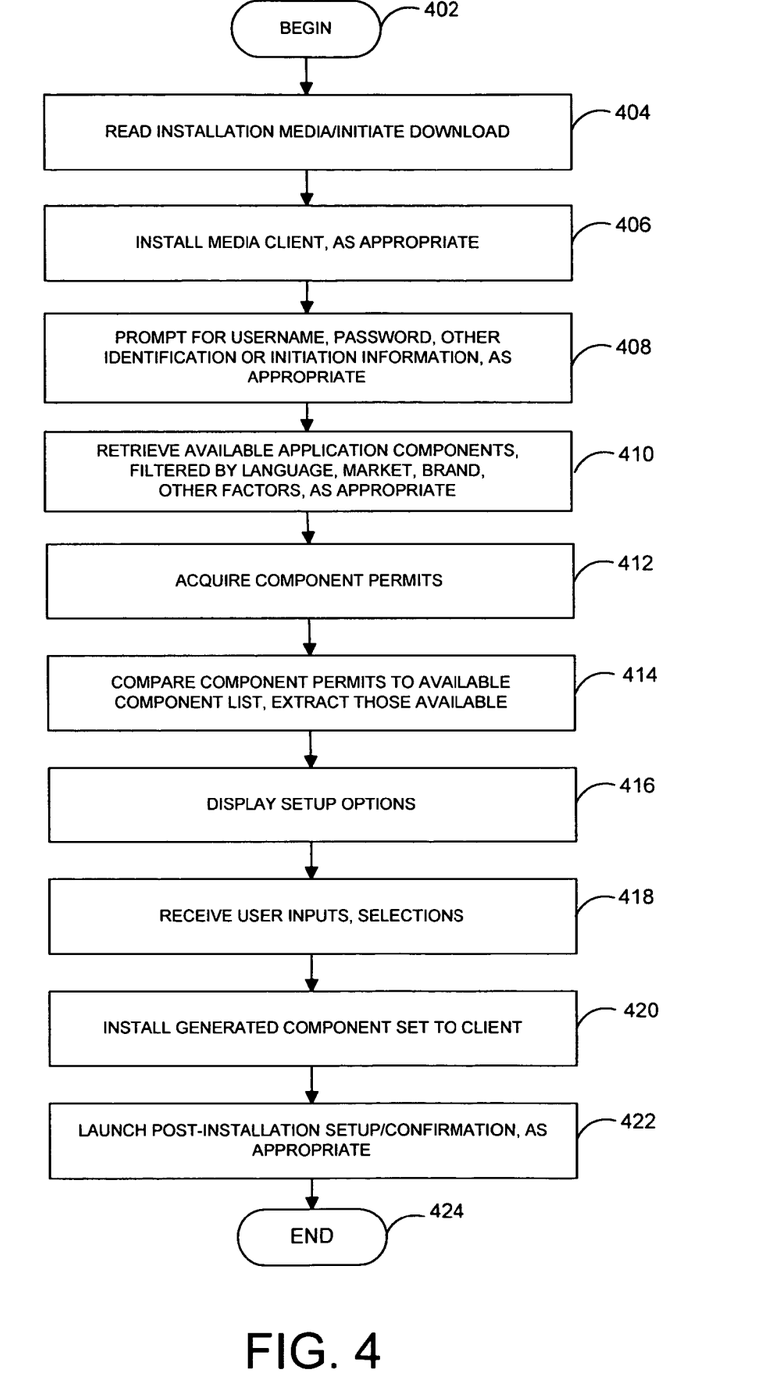
FIG. 4 illustrates overall subscription-driven installation processing, according to an embodiment of the invention.

Overall installation processing according to embodiments of the invention is illustrated in further regard in FIG. 4. In step 402, processing may begin. In step 404, installation may be initiated by reading installation media such as a CD-ROM or other removable or other media, by initiating access to an installation Web site or a download from a Web site, or other channels. In step 406, a client software containing an installation engine, such as Microsoft Network (MSN) or other media or other client software, may be installed, for instance onto the hard drive of client 102 or other client or device. In instances where the client 102 already has a media client installed, that installation may be omitted, or updating to current versions may take place. In step 408, a subscriber signup or login process may be initiated, for instance by prompting the user for a username, password, security-enabled account login such as a Microsoft PassPort™ account, or other account setup, authorization, verification or authentication routines.

In step 410, an available component list 112 for the user may be retrieved, for example from subscription database 110. The available component list 112 may be filtered or conditioned based on subscriber status information for that user, such as geographic location, language, market or co-branding limitations or preferences, age restrictions (for example, in a multiuser family account), or other factors. In step 412, service component permits for the user may be acquired, for instance by accessing the user's subscribed services list 114 or otherwise. In step 414, the permits or authorizations for various service components for that user may be compared against the available component 112 to identify and extract those services that are desired, permitted and available to the user. In step 416, setup options based on those filtered services may be displayed to the user. For example, the user may be asked to select a degree of anti-spam protection, for instance low, medium or high. Other services and selections may be presented.

In step 418, the user's selections or other inputs may be received in installation engine 120 or other installation logic. In step 420, the generated set of final component services may be installed in client 102 or other client or device. In step 422, any post-installation setup or confirmation may be launched, for example to display a welcome screen to the user inviting them to log in to one or more service. In step 424, processing may repeat, return to a prior processing point, jump to a further processing point or end.

The foregoing description of the invention is illustrative, and modifications in configuration and implementation will occur to persons skilled in the art. For instance, while the invention has generally been described in terms of subscriber status data stored and accessed from a single subscription database 110, in embodiments data regarding one or more users may be shared or distributed across multiple databases or data hosts. In embodiments all or part of that data may be stored in client 102, itself.

Further, while the invention has generally been described in embodiments wherein the installation engine 120 may be hosted in client 120, in embodiments the installation engine 120 or similar logic may be hosted or may execute in other local or remote resources, including the installation server 108. Similarly, while the invention has in embodiments been generally described as involving subscriptions covering individual users, in embodiments the subscriptions to services and corresponding installation management may be for groups of users or organizations. Other hardware, software or other resources described as singular may in embodiments be distributed or shared, and similarly in embodiments resources described as distributed may be combined. The scope of the invention is accordingly intended to be limited only by the following claims.

We claim:

1. A computer system for installing a computer network service component on a client associated with a user, wherein the user subscribes to a computer network service, the system comprising:
   a graphical user interface (GUI) that guides the user through an installation process for one or more service components associated with a computer network service, wherein the GUI receives a service installation request from the user, the service installation request comprising a request for the one or more service components;
   a subscription database comprising a subscribed services list, wherein the subscribed services list comprises subscriber status information corresponding to the user, wherein said subscriber status information comprises information indicating the service components that the user is permitted to receive based on the user's subscription;
   an installation engine that manages the distribution of computer network service components to the client, the installation engine communicating with the user interface and the subscription database, wherein the installation engine references an available components list to identify a set of components that are available to the user, and further wherein the installation engine compares the available components list against the subscribed services list to identify a set of eligible components, the eligible components comprising available components that the user is permitted to receive, wherein the installation engine provides the set of eligible components to the GUI, which displays the set of eligible components to the user; and a local installation server that receives a selection of at least one of the set of eligible components from the user and retrieves the at least one eligible component from a component store, wherein the local installation server provides the at least one eligible component to the installation engine for installation onto the client.

2. The system of claim 1, wherein at least one of the one or more service components comprises a component corresponding to at least one of network access, network services and media services.

3. The system of claim 2, wherein the at least one service component comprises a component corresponding to at least network services and media services, the network services comprising at least one of email service, Web hosting service, antivirus service and firewall service, and the media services comprising at least one of network image exchange, music download service and video download service.

4. The system of claim 1, wherein the service installation request is generated in an installation routine initiated via computer readable media.

5. The system of claim 1, wherein the service installation request is generated in an installation routine initiated via a network download.

6. The system of claim 1, wherein the installation engine qualifies the set of available subscriber components against at least one of geographic criteria, marketing criteria and language criteria.

7. The system of claim 1, wherein installing the at least one service component comprises initiating a new service installation.

8. The system of claim 1, wherein installing the at least one service component comprises an update to an existing service component.

9. One or more computer-storage media having computer-executable instructions embodied thereon that, when executed by a computer, cause the computer to perform a method for installing a computer network service component on a client associated with a user, wherein the user subscribes to a computer network service, the method comprising:
   providing a graphical user interface (GUI) to the user, wherein the GUI guides the user through installation of the computer network service component on the client;
   receiving a service installation request from a user, wherein said service installation request comprises a request for installation of one or more service components associated with a computer network service onto a client device associated with the user;
   initiating a local installation engine that communicates with a subscription database to identify appropriate service components for installation, wherein the subscription database comprises a subscribed services list that indicates service components that the user is permitted to receive based on the user's subscription;
   referencing an available components list to identify a set of service components that are available to the user;
   comparing the available components list against the subscribed services list to identify a set of eligible components, wherein the set of eligible components comprises a set of available service components that the user is permitted to receive; and
   presenting to the user, via the GUI, the set of eligible components and options that allow the user to select one or more of the eligible components for installation.

10. The media of claim 9, wherein the computer network service comprises at least one of network access, network services and media services.

11. The media of claim 10, wherein the computer network service comprises at least network services and media services, the network services comprising at least one of email service, Web hosting service, antivirus service and firewall service, and the media services comprising at least one of network image exchange, music download service and video download service.

12. The media of claim 9, further comprising generating the service installation request in an installation routine initiated via computer readable media.

13. The media of claim 9, further comprising generating the service installation request in an installation routine initiated via a network download.

14. The media of claim 9, further comprising qualifying the set of available subscriber components against at least one of geographic criteria, marketing criteria and language criteria.

15. The media of claim 9, further comprising communicating with an installation server to perform the service installation.

16. The media of claim 9, wherein the service installation comprises an initiation of a new service installation.

17. The media of claim 9, wherein the service installation comprises an update to an existing service installation.

18. One or more computer-storage media having computer-executable instructions embodied thereon that, when executed by a computer, cause the computer to perform a method for installing a computer network service component on a client associated with a user, wherein the user subscribes to a computer network service, the method comprising:
   receiving a service installation request from a user, wherein said service installation request comprises a request for installation of one or more service components associated with a computer network service onto a client device associated with the user;
   referencing an available components list to identify a set of service components that are available to the user;
   filtering the available component list according to at least one of geographic criteria, marketing criteria, and language criteria;
   referencing a subscription database, wherein the subscription database comprises a subscribed services list that indicates service components that the user is permitted to receive based on the user's subscription;
   comparing the filtered available components list against the subscribed services list to identify a set of eligible components, wherein the set of eligible components comprises a set of available service components that the user is permitted to receive; and
   presenting to the user a listing of the eligible components.

19. The media of claim 18, wherein the one or more service components corresponds to at least one of network access, network services and media services.

20. The media of claim 19, wherein the one or more service components corresponds to at least network services and media services, the network services comprising at least one of email service, Web hosting service, antivirus service and firewall service, and the media services comprising at least one of network image exchange, music download service and video download service.

21. The media of claim 18, wherein the service installation request is generated in an installation routine initiated via computer readable media.

22. The media of claim 18, wherein the service installation request is generated in an installation routine initiated via a network download.

23. The media of claim 18, wherein the service installation comprises an installation of a new component.

24. The media of claim 18, wherein the service installation comprises an update to an existing component.

25. One or more computer-storage media having computer-executable instructions embodied thereon that, when executed by a computer, cause the computer to perform a method for performing a computer network service component installation, the method being performed by an installation engine hosted by a client device associated with a subscriber, the method comprising:

receiving a notification that the subscriber has initiated a process for installing a computer network service component on the client device associated with the subscriber;

authenticating the subscriber, wherein said authenticating comprises performing a lookup of account information received from the subscriber against a subscription database;

providing a graphical user interface (GUI) to the user, wherein the GUI guides the user through installation of the computer network service component on the client;

referencing an available component list hosted by the subscription database, the available component list comprising a listing of computer network service components that are available for installation;

filtering the available component list according to marketing criteria;

accessing a subscribed services list hosted by the subscription database, the subscribed services list comprising a listing of computer network service components that the subscriber is permitted to install;

identifying a plurality of eligible components, each of the plurality of eligible components comprising an available computer network service component that the subscriber is permitted to install, wherein said identifying comprises comparing the filtered available component list against the subscribed services list;

presenting a set of installation options on the GUI associated with the client device, the set of installation options comprising the plurality of eligible components;

receiving a user selection of at least one eligible component;

installing the selected at least one eligible component on the client device; and     updating the subscription database to reflect the computer network service component installation.

26. The media of claim 25, wherein the computer network service component comprises a service component for facilitating at least one of network access, network services and media services.

27. The media of claim 26, wherein the computer network service component comprises a service component for facilitating network services, the network services comprising at least one of email service, Web hosting service, antivirus service and firewall service.

28. The media of claim 26, wherein the computer network service component comprises a service component for facilitating media services, the media services comprising at least one of network image exchange, music download service and video download service.

29. The media of claim 25, wherein the method further comprises retrieving the selected at least one eligible component from computer readable media.

30. The media of claim 25, wherein the method further comprises retrieving the selected at least one eligible component from a component store, the component store being hosted by a subscription server, wherein the subscription server is remote from the client device.

31. The media of claim 30, wherein the subscription database is hosted by a subscription server, the subscription server being remote from the client device.

32. The media claim 25, wherein the selected at least one eligible component comprises a new service component.

33. The media of claim 25, wherein the selected at least one eligible component comprises an update to an existing service component.

\* \* \* \* \*

UNITED STATES PATENT AND TRADEMARK OFFICE
CERTIFICATE OF CORRECTION

PATENT NO. : 7,660,871 B2  Page 1 of 1
APPLICATION NO. : 10/855631
DATED : February 9, 2010
INVENTOR(S) : Koh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1312 days.

Signed and Sealed this

Thirtieth Day of November, 2010

David J. Kappos
*Director of the United States Patent and Trademark Office*